Aug. 4, 1931.  K. KLINGER  1,817,258
STOPCOCK
Filed May 23, 1929
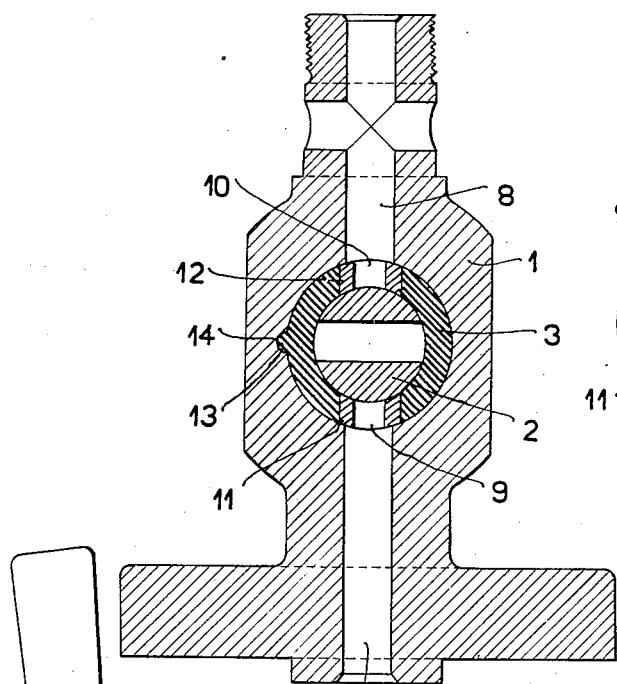
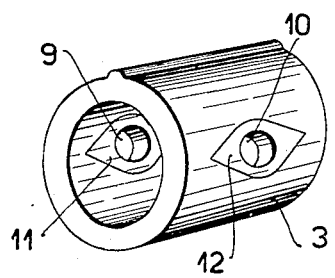
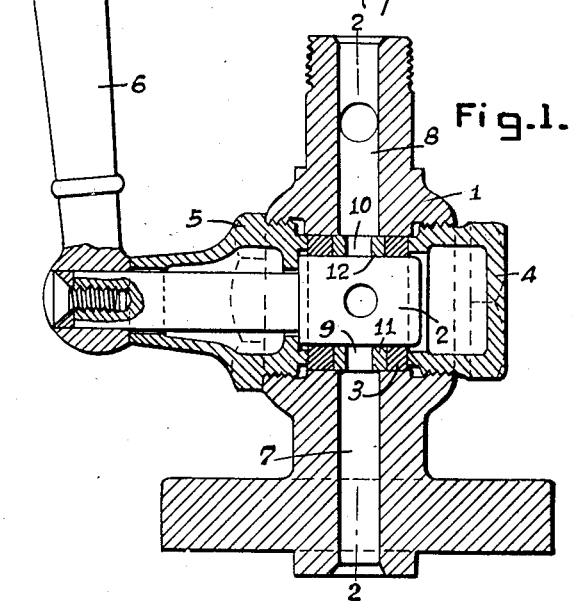
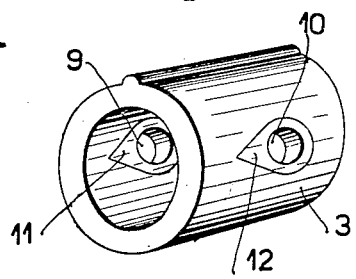
Inventor,
Karl Klinger,
By Henry Orth
Atty.

Patented Aug. 4, 1931

1,817,258

UNITED STATES PATENT OFFICE

KARL KLINGER, OF GUMPOLDSKIRCHEN, AUSTRIA

STOP-COCK

Application filed May 23, 1929, Serial No. 365,469, and in Austria June 1, 1928.

The invention relates to a stop-cock of the kind, in which a cylindrical packing member consisting of a mass which is practically hard but plastic to a certain extent and made of asbestos and graphite is inserted between the plug and the cock casing, this cylindrical packing member being somewhat upset when pressure is exerted upon its base surface and thereby firmly tightened against cock and casing.

In structures employing short tubes having cylindrical internal and external surfaces, these tubes will not stay in place, and will rotate and shift in the packing cylinder when the packing is compressed on its ends to tighten it. Furthermore, this compression will deform the hole in which the tubes are seated by reason of the compressing force not being uniformly distributed around the holes so that the packing material will not closely contact around these tubes at all points.

To avoid these disadvantages I have made the exterior surfaces of these tubes wedge-shaped so that the wedges lie in the direction of the compression pressure.

Such an arrangement prevents rotation and displacement of the tubes and permits the material of the packing to be displaced and compressed about the tubes without leaving them at any point of their circumference.

The invention is shown by way of example in the accompanying drawings, wherein

Fig. 1 is a vertical section and

Fig. 2 is a section on the line 2—2 of Fig. 1.

Fig. 3 shows the cylindrical packing member in a perspective view with inserted metal pieces being symmetrically wedge-shaped on both sides.

Fig. 4 is a view of a cylindrical member with inserted metal pieces wedge-shaped on their one side.

The cock casing 1 has a bore which is so large that the cylindrical packing member 3 made of asbestos and graphite can be put between the casing and the plug 2. The cylindrical packing member abutting against the screw 5 of the handle 6 is capable of being deformed to such extent by a threaded cap 4 to be screwed into the casing 1, that it is firmly tightened with its surfaces against the casing 1 and the plug 2, thereby securing complete tightening even with high pressure.

The cylindrical packing member 3 is provided with openings 9 and 10 corresponding to the channels in the casing not formed in the plastic mass itself but in metal pieces 11 and 12 inserted in the latter, whereby corrosion of the plastic mass by the fluid passing through is avoided.

According to the invention the metal pieces 11 and 12 are wedge-shaped, thereby assuring the above mentioned advantages. Fig. 3 shows a cylindrical packing member with inserted metal pieces wedge-shaped on both sides provided with openings 9 and 10 in order to permit the fluid to pass. Fig. 4 shows another modification of the metal pieces which in this case are wedge-shaped on one side. By the annular part of the metal pieces secures an efficient abutment against the packing member and are so inserted into the hard, but slightly compressible packing cylinder that the wedge extends in the direction of compression on the cylinder parallel to the axis of the cylinder.

In order to assure the correct position of the packing member and of its openings with respect to the channels of the cock casing, if necessary, a slot 14 is provided in the cock casing 1 with which a ledge 13 at the corresponding place of the cylindrical member 3 may be brought into engagement.

What I claim is:—

1. A stop-cock of the type specified having a slightly compressible sleeve of packing material inserted between the plug and the casing of the cock, said sleeve being provided with openings, and metal bodies being inserted within said sleeve in said openings, the outer wall of each of the metal bodies being wedge-shaped and said wedges extending parallel to the axis of the sleeve.

2. A stop-cock having a compressible packing between the plug and casing of the cock. in combination with tubular metal bodies having openings therethrough inserted in and extending through the packing and having opposite external wedge-shaped portions directed in the line of compression.

In testimony that I claim the foregoing as my invention, I have signed my name.

KARL KLINGER.